United States Patent
Burcham et al.

(10) Patent No.: US 10,911,888 B1
(45) Date of Patent: Feb. 2, 2021

(54) PATTERN MATCHING IN POINT-OF-INTEREST (POI) TRAFFIC ANALYSIS

(71) Applicant: Sprint Communications Company L.P., Overland Park, KS (US)

(72) Inventors: Robert H. Burcham, Overland Park, KS (US); Matthew Habiger, Kansas City, KS (US); Adam C. Pickett, Prairie Village, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/860,719

(22) Filed: Apr. 28, 2020

Related U.S. Application Data

(62) Division of application No. 16/379,789, filed on Apr. 9, 2019, now Pat. No. 10,694,321.

(51) Int. Cl.
  *H04W 4/00* (2018.01)
  *H04W 4/021* (2018.01)
  *H04W 4/029* (2018.01)

(52) U.S. Cl.
  CPC .......... *H04W 4/021* (2013.01); *H04W 4/029* (2018.02)

(58) Field of Classification Search
  CPC ...... H04W 4/029; H04W 64/00; H04W 4/021
  See application file for complete search history.

(56) References Cited

U.S. PATENT DOCUMENTS

| | | | |
|---|---|---|---|
| 8,391,836 | B1 | 3/2013 | Bolot |
| 8,589,318 | B2 | 11/2013 | Sundararajan et al. |
| 9,122,693 | B2 | 9/2015 | Blom et al. |
| 9,171,461 | B1 | 10/2015 | Dabell |
| 9,326,096 | B1 | 4/2016 | Gatmir-Motahari et al. |
| 9,710,873 | B1 | 7/2017 | Hill |
| 10,332,151 | B2 | 6/2019 | Megdal |

(Continued)

FOREIGN PATENT DOCUMENTS

GB 2516513 A 1/2015

OTHER PUBLICATIONS

Office Action dated Apr. 15, 2020, U.S. Appl. No. 15/838,016, filed Dec. 11, 2017.

(Continued)

*Primary Examiner* — Omoniyi Obayanju

(57) ABSTRACT

A method of determining presence of mobile communication devices at points-of-interest. The method comprises analyzing location data of a mobile communication device by a clustering application executing on a computer system, determining clusters of the location data by the clustering application, determining cluster centroids by the clustering application, determining a plurality of routes traveled by the device by a routing application based on the centroids, analyzing the centroids and the routes by a patterning application, determining a pattern of association between the centroids and the routes by the patterning application, observing a previously determined pattern of centroids by the patterning application, and based on observing the previously determined pattern of centroids, determining a route traveled by the device by the patterning application, whereby an instance of determining the route traveled by the device by the routing application is avoided.

16 Claims, 5 Drawing Sheets

(56) References Cited

U.S. PATENT DOCUMENTS

| | | |
|---|---|---|
| 10,469,981 B1 | 11/2019 | Dannamaneni et al. |
| 10,555,130 B1 | 2/2020 | Burcham et al. |
| 10,645,531 B1 | 5/2020 | Burcham et al. |
| 10,657,806 B1 | 5/2020 | Burcham et al. |
| 10,694,321 B1 | 6/2020 | Burcham et al. |
| 10,715,950 B1 | 7/2020 | Burcham et al. |
| 10,715,964 B1 | 7/2020 | Burcham et al. |
| 2002/0188550 A1 | 12/2002 | Swartz et al. |
| 2004/0254698 A1 | 12/2004 | Hubbard et al. |
| 2006/0100956 A1 | 5/2006 | Ryan et al. |
| 2008/0201305 A1 | 8/2008 | Fitzpatrick et al. |
| 2009/0150217 A1 | 6/2009 | Luff |
| 2009/0319177 A1 | 12/2009 | Khosravy et al. |
| 2010/0094867 A1 | 4/2010 | Badros et al. |
| 2010/0279708 A1 | 11/2010 | Lidsrom et al. |
| 2012/0005532 A1 | 1/2012 | Li et al. |
| 2012/0008526 A1 | 1/2012 | Borghei |
| 2012/0040637 A1 | 2/2012 | Wigren |
| 2013/0267255 A1* | 10/2013 | Liu ................. H04W 4/029 455/456.3 |
| 2014/0122220 A1 | 5/2014 | Bradley et al. |
| 2015/0029176 A1 | 1/2015 | Baxter et al. |
| 2015/0051829 A1 | 2/2015 | Gearhart et al. |
| 2015/0081617 A1 | 3/2015 | Shaik et al. |
| 2015/0088423 A1 | 3/2015 | Tuukkanen |
| 2015/0106011 A1 | 4/2015 | Nesbitt |
| 2015/0146917 A1 | 5/2015 | Bernal et al. |
| 2015/0149285 A1 | 5/2015 | Schroeter |
| 2015/0201298 A1 | 7/2015 | Zhang et al. |
| 2015/0204680 A1 | 7/2015 | Lee et al. |
| 2015/0278868 A1 | 10/2015 | O'Connor et al. |
| 2016/0076908 A1* | 3/2016 | Pang ................. G06F 16/9537 701/494 |
| 2016/0330589 A1 | 11/2016 | Tuukkanen |
| 2016/0367899 A1 | 12/2016 | Boncyk |
| 2017/0153113 A1 | 6/2017 | Gotoh et al. |
| 2017/0187788 A1 | 6/2017 | Botea et al. |
| 2017/0213240 A1 | 7/2017 | Waldron et al. |
| 2017/0223497 A1 | 8/2017 | Wang |
| 2017/0277716 A1 | 9/2017 | Giurgiu et al. |
| 2018/0240026 A1 | 8/2018 | Pietrobon et al. |
| 2018/0259356 A1 | 9/2018 | Rolf et al. |
| 2018/0266829 A1 | 9/2018 | Frtiz et al. |
| 2018/0283896 A1 | 10/2018 | Piemonte et al. |
| 2018/0330403 A1 | 11/2018 | Olivieri |
| 2019/0220898 A1 | 7/2019 | Rhodes et al. |
| 2019/0347679 A1* | 11/2019 | Banerjee ............ G06Q 30/0255 |

OTHER PUBLICATIONS

Final Office Action dated Jul. 28, 2020, U.S. Appl. No. 15/838,016, filed Dec. 11, 2017.

Notice of Allowance dated Mar. 16, 2020, U.S. Appl. No. 16/714,277 filed Dec. 13, 2019.

Notice of Allowance dated Mar. 12, 2020, U.S. Appl. No. 16/398,258, filed Apr. 29, 2019.

Restriction Requirement dated Jan. 23, 2019, U.S. Appl. No. 15/944,512, filed Apr. 3, 2018.

FAIPP Pre-Interview Communication dated May 28, 2019, U.S. Appl. No. 15/944,512, filed Apr. 3, 2018.

Notice of Allowance dated Jul. 10, 2019, U.S. Appl. No. 15/944,512, filed Apr. 3, 2018.

FAIPP Pre-Interview Communication dated Jan. 28, 2020, U.S. Appl. No. 15/838,016, filed Dec. 11, 2017.

Restriction Requirement dated Feb. 21, 2020, U.S. Appl. No. 15/838,016, filed Dec. 11, 2017.

FAIPP Pre-Interview Communication dated Aug. 28, 2019, U.S. Appl. No. 16/398,258, filed Apr. 29, 2019.

FAIPP Office Action dated Nov. 13, 2019, U.S. Appl. No. 16/398,258, filed Apr. 29, 2019.

Restriction Requirement dated Nov. 15, 2019, U.S. Appl. No. 16/398,254, filed Apr. 29, 2018.

Notice of Allowance dated Jan. 10, 2020, U.S. Appl. No. 16/398,254, filed Apr. 29, 2018.

Notice of Allowance dated Oct. 2, 2019, U.S. Appl. No. 16/379,784, filed Apr. 9, 2019.

Notice of Allowance dated Jan. 17, 2020, U.S. Appl. No. 16/379,786, filed Apr. 9, 2019.

Notice of Allowance dated Feb. 18, 2020, U.S. Appl. No. 16/379,798, filed Apr. 9, 2019.

Burcham, Robert H., et al., "Adapting Content Presentation Based on Mobile Viewsheds," filed Dec. 11, 2017, U.S. Appl. No. 15/838,016.

Bobe, Brooke M., et al., "Mobile Communication Device Locations Data Analysis Supporting Build-Out Decisions", filed Apr. 9, 2019, U.S. Appl. No. 16/379,774.

Burcham, Robert H., et al., "System and Method of Mobile Phone Location in a Subway Transit Environment," filed Apr. 9, 2019, U.S. Appl. No. 16/379,781.

Final Office Action dated Oct. 7, 2020, U.S. Appl. No. 15/838,016, filed Dec. 11, 2017.

* cited by examiner

PATTERN MATCHING IN POINT-OF-INTEREST (POI) TRAFFIC ANALYSIS

CROSS-REFERENCE TO RELATED APPLICATIONS

This application is a divisional of and claims priority under 35 U.S.C. § 120 to U.S. patent application Ser. No. 16/379,789, filed on Apr. 9, 2019, entitled "Pattern Matching in Point-of-Interest (POI) Traffic Analysis," by Robert H. Burcham, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Locations of mobile communication devices can serve as proxies for locations of human beings. By determining the location of mobile communication devices at specific times, storing this time-associated location data in a data store, and analyzing the location data, a variety of useful information can be generated. For example, a rate of human beings traversing an area at specific times of day and days of the week can be inferred. A speed of human beings (e.g., the cars which the human beings are driving or riding in) traversing an area can be inferred.

SUMMARY

In an embodiment, a method of determining presence of mobile communication devices at points-of-interest (POI) by establishing patterns of location clusters for each device, associating a route traveled by the device to each pattern of location clusters, and deeming the device to have followed the associated route when the locations of the mobile communication device matches the associated pattern of location clusters is disclosed. The method comprises analyzing a plurality of location data of a mobile communication device by a clustering application executing on a computer system, determining a plurality of clusters of the location data by the clustering application based on analyzing the location data, and determining a plurality of centroids by the clustering application, wherein each centroid is a centroid of one of the plurality of clusters of the location data. The method further comprises determining a plurality of routes traveled by the mobile communication device by a routing application executing on a computer system based on the centroids and based on a map of routes. The method further comprises analyzing the centroids and the routes traveled by the mobile communication device by a patterning application executing on a computer system, determining a pattern of association between the centroids and the routes traveled by the mobile communication device by the patterning application, observing a previously determined pattern of centroids by the patterning application, and, based on observing the previously determined pattern of centroids, determining a route traveled by the mobile communication device by the patterning application, whereby an instance of determining the route traveled by the mobile communication device by the routing application is avoided.

In another embodiment, a system for determining presence of mobile communication devices at points-of-interest (POI) by establishing patterns of location clusters for each device, associating a route traveled by the device to each pattern of location clusters, and deem the device to have followed the associated route when the locations of the mobile communication device matches the associated pattern of location clusters is disclosed. The system comprises at least one processor, a non-transitory memory, a location data store comprising location data entries, wherein each location data entry identifies a location, a mobile communication device, and a timestamp identifying when the mobile communication device was located at the identified location, a location centroid data store comprising location centroid entries, wherein each location centroid entry identifies a location, a mobile communication device, and a timestamp identified when the mobile communication device was located within a location cluster represented by the location centroid, a clustering application stored in the non-transitory memory, a routing application stored in the non-transitory memory, and a patterning application stored in the non-transitory memory. When executed by the at least one processor, the clustering application reads location data entries from the location data store, analyzes the location data entries, for each of a plurality of mobile communication devices, determines a plurality of clusters of locations associated with the mobile communication device based on analyzing the locations and the timestamps of the location data entries associated with the mobile communication device, builds a location centroid entry for each of the clusters of locations, and stores a plurality of location centroid entries in the centroid data store. When executed by the at least one processor, the routing application reads location centroid entries from the location centroid data store and, for each of the plurality of mobile communication devices, determines a plurality of routes traveled by the mobile communication device based on the location centroid entries and based on a map of routes. When executed by the at least one processor, the patterning application, for each of the plurality of mobile communication devices, analyzes the location centroid entries and the routes traveled by the mobile communication device, for each of the plurality of mobile communication devices, determines a pattern of association between the location centroid entries and the routes traveled by the mobile communication device, reads a plurality of current location centroid entries from the location centroid data store which have a timestamp restricted to a predefined recent time period, for at least one of the mobile communication devices, observes a previously determined pattern of location centroid entries in the current location centroid entries associated with the mobile communication device, and based on observing the previously determined pattern of location centroid entries, determines a route traveled by the mobile communication device, whereby an instance of determining the route traveled by the mobile communication device by the routing application is avoided.

In yet another embodiment, a method of determining presence of mobile communication devices at points-of-interest (POI) by establishing patterns of location clusters for each device, associating a route traveled by the device to each pattern of location clusters, and deem the device to have followed the associated route when the locations of the mobile communication device matches the associated pattern of location clusters is disclosed. The method comprises determining a plurality of centroids by a clustering application executing on a computer system based on analyzing location data of mobile communication devices, wherein each centroid comprises a location representing a cluster of location data of a mobile communication device, an identity of the mobile communication device, and a timestamp and determining a plurality of routes traveled by a mobile communication device by a routing application executing on a computer system based on the centroids associated with the mobile communication device and based on a map of routes. The method further comprises analyzing the centroids and the routes traveled by the mobile communication device by a patterning application executing on a computer system, wherein the timestamps of the centroids are restricted to a most recent first predefined time interval, determining a pattern of association between the centroids and the routes traveled by the mobile communication device by the patterning application, observing a previously determined pattern of centroids in a current set of centroids by the patterning application, wherein the current set of centroids have a timestamp restricted to a most recent second predefined time interval and the second predefined time interval is less than the first predefined time interval, and based on observing the previously determined pattern of centroids, determining a route traveled by the mobile communication device by the patterning application, whereby an instance of determining the route traveled by the mobile communication device by the routing application is avoided.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
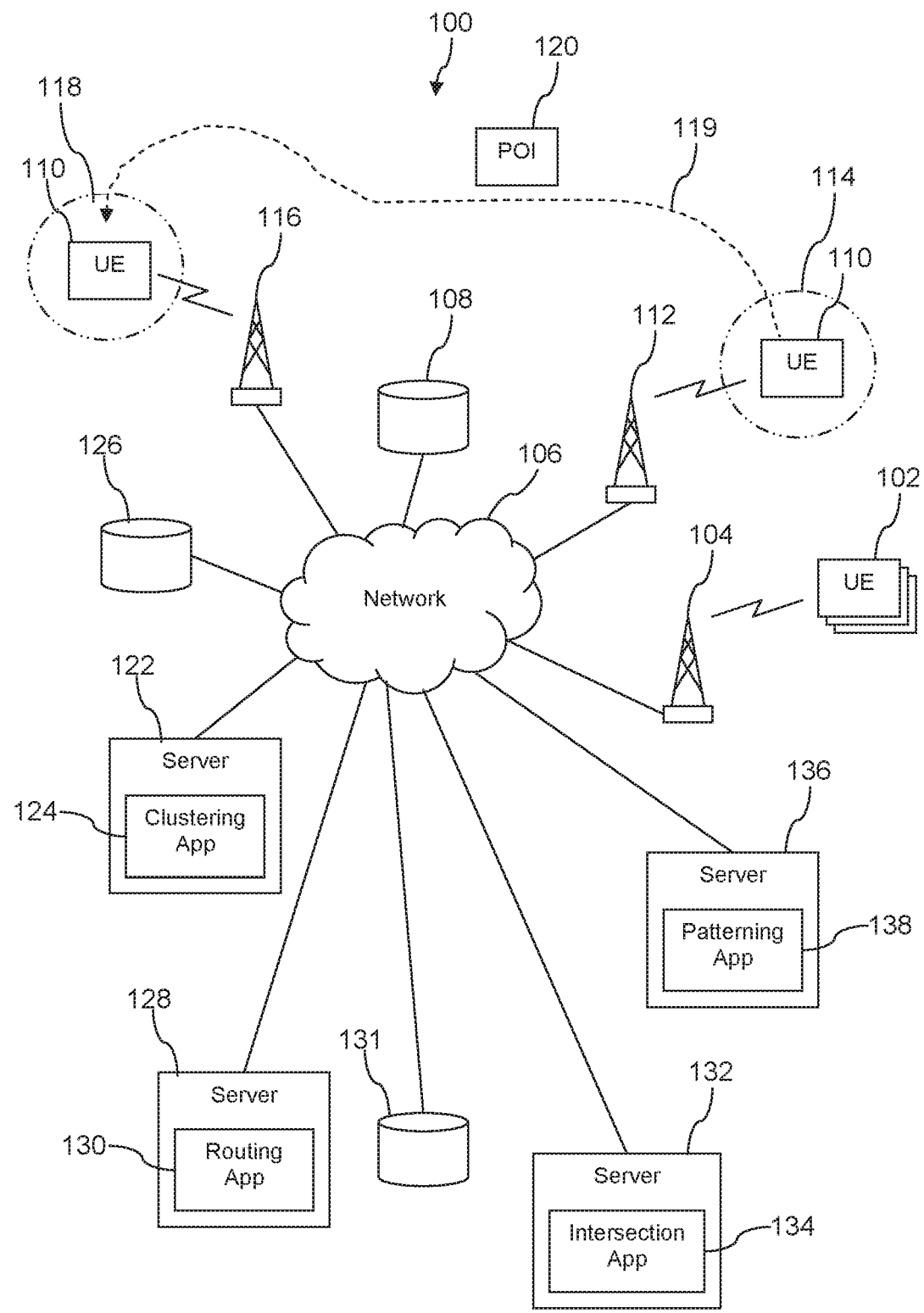
FIG. 1 is an illustration of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Location data pertaining to mobile communication devices can be collected by wireless communication service providers and analyzed to derive valuable information on the presence, dwell times, and movements of human beings. This information can be used to plan and adapt highway systems, construction plans, and business plans. This information can be used to establish values and prices for presenting content on billboards and on digital screens outside of the home. It is observed that in such analysis, the location of the mobile communication device serves as a proxy for the location of the human being using the mobile communication device.

Location data associated with mobile communication devices may cluster around locations where the mobile communication devices dwell for extended periods of time, for example at a home of a user or at a workplace of a user. When the user is commuting from home to work and from work to home, few location data points may be collected from the device along a travel route between home and work due to the relatively short duration of commutes and due to the decreased volume of communications the mobile communication device of the user undergoes during this travel time. According to the system and methods disclosed herein, location data that has been collected from a mobile communication device is processed by a clustering application executing on a computer system using clustering algorithms to determine clusters of the location data and to determine a centroid of the clusters determined. These centroids may be deemed putative locations of the mobile communication device. A travel route between the centroids of two location clusters can be determined by a routing application executing on a computer system based on an assumed travel mode (e.g., one of a highway travel mode, a light rail travel mode, a subway travel mode, a bus travel mode, and a footpath travel mode).

The present disclosure contemplates that the travel mode associated with location data may be inferred in a variety of different ways. Location data may comprise a location, an identity of the mobile communication device, an identity of a cell site to which the device is attached, and a timestamp comprising a date and time. The routing application may maintain a list of subway cell site identities, and if the identity of the cell site contained in the location data matches a subway cell site identity, that location data is assumed to be associated with a subway travel mode. The routing application may maintain a list of other radio resources located in the subways, for example WiFi access points, radio beacons associated with signage, subway system management radios, or other radio emitters. In an embodiment, the location data provided by the mobile communication devices may comprise information about these other radio resources detected by the mobile communication device, for example SSIDs of WiFi access points and radio identities of other radio emitters. These radio identities can be mapped to the list of radio resources by the routing application, and the routing application can then infer that the mobile communication device is associated with a subway travel mode.

In a like manner, radio identities or protocols that may be associated with other specific travel modes may be relied upon by the routing application to assign a travel mode and therefore appropriately process location fix data. For example, radio protocols or radio frequency bands associated with metropolitan bus travel (e.g., radio resources employed by the buses and/or bus routing system) may be used by the routing application to infer a bus travel mode. For example, radio protocols or radio frequency bands associated with light rail travel (e.g., radio resources employed by the light rail system to manage and operate the light rail system) may be used by the routing application to infer a light rail travel mode.

The routing application may maintain a list of geofenced areas that are associated with specific travel modes, for example a city park geofenced area may be associated with a footpath travel mode and an interstate highway geofenced area may be associated with a highway travel mode. If the location of the location data falls within a geofenced area associated with a footpath travel mode, that location data is assumed to be associated with a footpath travel mode. If the location of the location data falls within a geofenced area associated with a highway travel mode, that location data is assumed to be associated with a highway travel mode.

The association of a travel mode to the location data based on either a cell site identity matching a known subway cell site identity or a location matching a geofenced area can be determined rapidly by the routing application executing on a computer. Location data that cannot be associated to a travel mode based on these considerations may be analyzed more painstakingly to determine an assumed travel mode. For example, the routing application may analyze the timestamps associated with a plurality of location data to infer a speed of travel associated with one or more of the location data. If the inferred speed is above a first predefined speed threshold, the location data is associated to the highway mode of travel. If the inferred speed is below a second predefined speed threshold, where the second speed threshold is less than the first speed threshold, the location data is associated to the footpath travel mode.

The routing application may select an imputed travel route between the centroids from a digital map of travel routes based on the assumed travel mode and based on identifying a shortest path between the centroids, for example using an open source routing machine. Thus, if the assumed travel mode is a footpath travel mode, a shortest path footpath travel route of the digital map may be determined by the routing application to be the imputed travel route. If the assumed travel mode is a highway travel mode, a shortest path highway travel route of the digital map may be determined by the routing application to be the imputed travel route. The routing application may automatically generate a plurality of inferred locations between the two centroids such that the inferred locations are located on the imputed travel route and are associated with timestamps consistent with timestamps associated with the two centroids and a direction of travel between the two centroids.

In an embodiment, the digital map may represent travel routes as a sequence of route segments that abut one another. For example a first end of a first route segment abuts a first end of a second route segment, a second end of the second route segment abuts a first end of a third route segment, a second end of the third route segment abuts a first end of a fourth route segment, etc. In an embodiment, these route segments may comprise mathematical abstractions or computer representations referred to as edges and vertices (route segments abut one another at the vertices). In an embodiment, the locations may be designated by the route segment to which they are associated.

An intersection application executing on a computer system can compare the locations to the definition of the location of a point-of-interest (POI) to determine if the mobile communication device passes through or intersects the area of the POI. A POI may be associated with a building, a sports venue, a billboard, or a presentation screen. The intersection application can determine the numbers of mobile communication devices that intersect the POI and provide useful traffic statistics such as how many mobile communication devices intersect with the POI per day, how many mobile communication devices intersect with the POI during specific hours during the day.

The present disclosure contemplates analyzing previously determined clustering results and routing results for each of a plurality of mobile communication devices to identify repeating patterns of routes traveled by the devices. When a pattern having a sufficient level of confidence is identified, when current clustering analysis data associated with a mobile communication device is determined to fit the pattern, the routing results associated with the pattern are deemed applicable without performing the routing algorithm, thereby achieving considerable saving of computer processing time. For example, clustering results and routing results may be collected for a month. A patterning application may process the clustering results and the routing results to identity a cluster results versus routing results pattern. When processing current location data associated with the mobile communication device, if a time sequence of the current centroids determined match sufficiently to the time sequence of centroids of the pattern (corresponding centroids have approximately the same location), the routing results associated to the pattern with the centroids result are deemed applicable, and the processing of the currently determined centroids by the routing algorithm is omitted. The applied routing results are then used for other purposes, such as analyzing intersections of routes of the mobile communication device with POIs. Because a significant number of people (e.g., more than 80%) may exhibit repeating patterns of travel (e.g., from home to work, from work to home, from home to the gym, from the gym home), a significant portion of the routing algorithm processing can be obviated after an initial training period when these repeating patterns of travel are identified.

In an embodiment, the time of the time sequence of centroids of the current location data and the time of the time sequence of centroids of the pattern may be offset or shifted in time. For example, the first centroid of the current location data is located approximately the same location as a first centroid of the pattern, a second centroid of the current location data is located approximately at the same location as a second centroid of the pattern, a third centroid of the current location data is located approximately at the same location as a third centroid of the pattern, and a fourth centroid of the current location data is located approximately at the same location as a fourth centroid of the pattern. Further, the first centroid of the current location data may be associated with a timestamp of about 8:04 AM, the second centroid of the current location data with 8:05 AM, the third centroid of the current location data with 8:06 AM, and the fourth centroid of the current location data with 8:07 AM. The first centroid of the pattern may be associated with a timestamp of about 7:34 AM, the second centroid of the pattern with 7:35 AM, the third centroid of the pattern with 7:36 AM, and the fourth centroid of the pattern with 7:37 AM. Because the corresponding centroids are approximately located in the same locations, and because the time sequence of the corresponding centroids is the same, the routing application may assume that the mobile communication device is following the same route but time shifted. For example, the subscriber may be commuting to work with a half-hour delay because of dropping off and picking up laundry at the cleaners or because of having to replace a flat tire. In assigning inferred location fixes to the mobile communication device based on attributing the route of the matching pattern to the route traveled by the mobile communication device currently (e.g., in the current day of location data under analysis), the routing algorithm can assign previously determined inferred location fixes to the mobile communication device while time shifting all the time stamps of the inferred location fixes accordingly. In the example given above, the routing application may copy the inferred location fixes associated with the example pattern and change the timestamp of each of the copied inferred location fixes by adding 30 minutes.

In an embodiment, a plurality of location data items associated with one mobile communication device for a delimited period of time (e.g., for a day) is represented in a matrix. Each location data item may be represented by one element in the matrix. In an embodiment, the matrix may be a three dimensional matrix, where a first dimension of the matrix represents a latitude coordinate of the device location, a second dimension of the matrix represents a longitude coordinate of the device location, and a third dimension of the matrix represents a timestamp of the device location. In another embodiment, the matrix may be a two dimensional matrix, where a first dimension of the matrix represents a geohash of the device location and the second dimension of the matrix represents a timestamp of the device location. Each element of the multi-dimensional matrix represents the presence or absence of the device at that corresponding location at that corresponding time. The value of each element may be a '0' to represent absence of the device at that location and time and may be a '1' to represent presence of the device at that location and time. The locations may correspond to centroids of location clusters associated with the mobile communication device. A pattern of association of a time sequence of centroids to one or more routes can be determined and stored in a data store. When the current sequence of centroids is determined, it can be used to attempt to look-up an associated route in the data store. If such a look-up is successful, the looked-up route is used without processing the current centroid data by the computationally intensive routing algorithm performed by the routing application.

Turning now to FIG. 1, a system 100 is described. In an embodiment, the system 100 comprises a plurality of mobile communication devices (user equipments—UEs) 102 communicating via a plurality of cell sites 104 to a network 106. One of the UEs 102 may be any of a mobile phone, a smart phone, a personal digital assistant (PDA), a wearable computer, a headset computer, a laptop computer, a notebook computer, or a tablet computer. It is understood that some of the UEs 102 may be mobile phones, others of the UEs 102 may be smart phones, others of the UEs 102 may be wearable computers, others of the UEs 102 may be headset computers, others of the UEs 102 may be laptop computers, others of the UEs 102 may be tablet computers, and others of the UEs 102 may be notebook computers. The network 106 may be one or more private networks, one or more public networks, or a combination thereof. The cell site 104 may provide a wireless communication link to the UE 102 according to a long term evolution (LTE), a code division multiple access (CDMA), a global system for mobile communication (GSM), or a worldwide interoperability for microwave access (WiMAX) telecommunication protocol. In an embodiment, the cell site 104 may provide a wireless communication link to the UE 102 according to a 5G wireless communication protocol.

One of the UEs 102 may be represented as UE 110 that is initially located within a first location cluster area 114 at a first time when it is in wireless communication with a first cell site 112. The UE 110 may move from the first location cluster area 114 to a second location cluster area 118 at a second time when it is in wireless communication with a second cell site 116. In moving from first location area 114 to second location area 118, the UE 110 may follow a route 119 that intersects with a point-of-interest (POI) 120.

In an embodiment, the system 100 comprises a location data store 108 that stores location data associated with the UEs 102, 110. Each item of location data in the location data store 108 may comprise an identity of a UE 102, 110, a location, and a timestamp. The items of location data may be referred to as location entries in the location data store 108. The location entries may be created by a computer system that receives information pertaining to the UE 102, 110 that can be analyzed to create the location entries. For example, a cell site 104, 112, 116 may send a message indicating that the UE 102, 110 is attached to the cell site 104, 112, 116 to receive wireless communication coverage. In this case, a known location of the cell site 104, 112, 116 may be assigned to represent the approximate location of the UE 102, 110 by proxy. In an embodiment, this location of the cell site 104, 112, 116 may be modified slightly based on what sector of the cell site the UE 102, 110 receives wireless coverage, whereby to increase the accuracy of the approximation of the location of the UE 102, 110. Some of the location entries may be created by multilateration techniques or by trilateration techniques that determine a location of a UE 102, 110 based on strength of wireless signals received from the UE 102, 110 by several cell sites each at a known location. In an embodiment, the location entries may be created on the event of the UE 102, 110 transmitting or receiving a communication message or voice call, for example receipt or transmission of a text message. Some of the location entries may be created by the computer system based on GPS coordinates of the UE 102, 110 transmitted by the UEs 102, 110, for example pursuant to the UE 102, 110 using location based services.

In an embodiment, the system 100 further comprises a first computer system 122 executing a clustering application 124, where the clustering application 124 analyzes the location entries in the location data store 108 to identify clusters of locations of the UEs 102, 110 and to determine centroids of the clusters. The clustering application 124 may store the clustering results in a cluster data store 126. In an embodiment, the system 100 further comprises a second computer system 128 executing a routing application 130, where the routing application 130 analyzes the centroids of the clusters stored in the cluster data store 126 to determine routes traveled by the UEs 102, 110. The routing application 130 may store the routing results in a routes data store 131.

The route 119 traveled by the UE 110 between the centroids of two location cluster areas 114, 118 can be determined by the routing application 130 based on an assumed travel mode (e.g., one of a highway travel mode, a light rail travel mode, and a footpath travel mode). The routing application 130 may select an imputed travel route between the centroids from a digital map of travel routes based on the assumed travel mode and based on identifying a shortest path between the centroids, for example using an open source routing machine. The routing application 130 may automatically generate a plurality of inferred locations of the UE 110 between the two location cluster areas 114, 118 such that the inferred locations are located on the route 119 and are associated with timestamps consistent with timestamps associated with the two centroids and a direction of travel between the two centroids. Said in other words, by generating the inferred locations of the UE 102, 110 along the determined route 119, the route of the UE 102, 110 is defined or traced. This set of inferred locations may be used by the intersection application 134. The processing of the routing application 130 may present a relatively heavy load on the computer system 128, considering that the processing may be performed for each of a large number of UEs 102, 110 on a daily basis and considering that a large number of inferred locations are determined. One of the benefits of the teachings of the present disclosure is to obviate the processing of the routing application 130 for at least some of the location information in the location data store 108 and/or at least some of the centroid entries in the cluster data store 126.

In an embodiment, the system 100 further comprises a third computer system 132 executing an intersection application 134, where the intersection application 134 analyzes the routing results stored in the routes data store 131 to determine intersections of UEs 102, 110 with POIs 120. Because the location of the UEs 102, 110 is a proxy for the locations of the users of the UEs 102, 110, the counts of intersections provides valuable information about traffic of the users proximate to the POIs 120. This information may be useful in developing business plans and negotiating values of presentation of content on digital billboards and/or on screens.

In an embodiment, the system 100 further comprises a fourth computer system 136 executing a patterning application 138 that analyzes sequences of centroids of each of location centroids associated with the same UEs 102, 110 to identify patterns of repeating location. For example, an office worker may travel from the first location cluster area 114 corresponding to a residence to the second location cluster area 118 corresponding to an office building most mornings between 7:30 AM and 8:30 AM Monday through Friday and from the second location cluster area 118 to the first location cluster area 114 between 5:30 PM and 6:30 PM Monday through Friday. When the patterning application 138 identifies a pattern of repeating locations, the patterning application 138 can command that the processing of the associated location and/or centroid information by the routing application 130 be omitted and the routing results previously determined and associated with this pattern be relied upon, for example relied upon by the intersection application 134 to analyze intersections of the UE 102, 110 with the POI 120 or other POIs.

While the applications 124, 130, 134, 138 were described above as executing on different computer systems, in an embodiment, two or more of the applications 124, 130, 134, 138 may execute on the same computer system. Additionally, while the applications 124, 130, 134, 138 were described above as being different applications, in an embodiment, the functionality of two or more of the applications 124, 130, 134, 138 may be combined in a single application.

For more details on location clusters, inferring geolocations and/or location fixes of the UE 102, 110, and routing analysis, see U.S. patent application Ser. No. 15/944,512 filed Apr. 3, 2018, titled "Mobile Viewshed Analysis," by Prashanth Dannamaneni, et al, which is incorporated herein by reference in its entirety. For more details on intersection analysis, see U.S. patent application Ser. No. 15/838,016, filed Dec. 11, 2017, titled "Adapting Content Presentation Based on Mobile Viewsheds," by Robert H. Burcham, et al, which is incorporated herein by reference in its entirety. For more details on an alternative method of intersection analysis, see "U.S. patent application Ser. No. 16/379,781 filed Apr. 9, 2019, titled "Route Segmentation Analysis for Points of Interest," by Robert H. Burcham, et al, which is incorporated herein by reference in its entirety.

Figure 2:
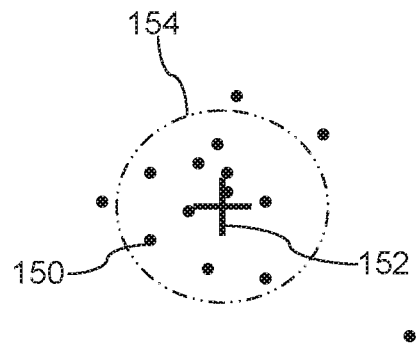
FIG. 2 is an illustration of a location cluster according to an embodiment of the disclosure.

Turning now to FIG. 2, a cluster of location entries 150 are described. Because location data may be imprecise, the locations of the UE 102, 110 may have varying values even when the UE 102, 110 is stationary, for example sitting on a desk at the office. The clustering application 124 analyzes the locations in the location data store 108 to cluster device locations that are proximate to each other, for example are co-located within the same ½ mile radius area. The clustering application 124 further determines a centroid 152 of the locations associated with a cluster which is represented in FIG. 2 as a cross. The centroid 152 may be determined as the average location of the locations making up a cluster—for example a location determined to have a latitude that is the average of the latitudes of locations in the cluster and to have a longitude that is the average of the longitudes of locations in the cluster. Alternatively, the centroid 152 may be determined as the average of the geohashes of the locations in the cluster. The cluster may be said to associate to an area 154, for example to a circular area centered on the centroid 152 having a ½ mile radius or some other radius.

Figure 3:
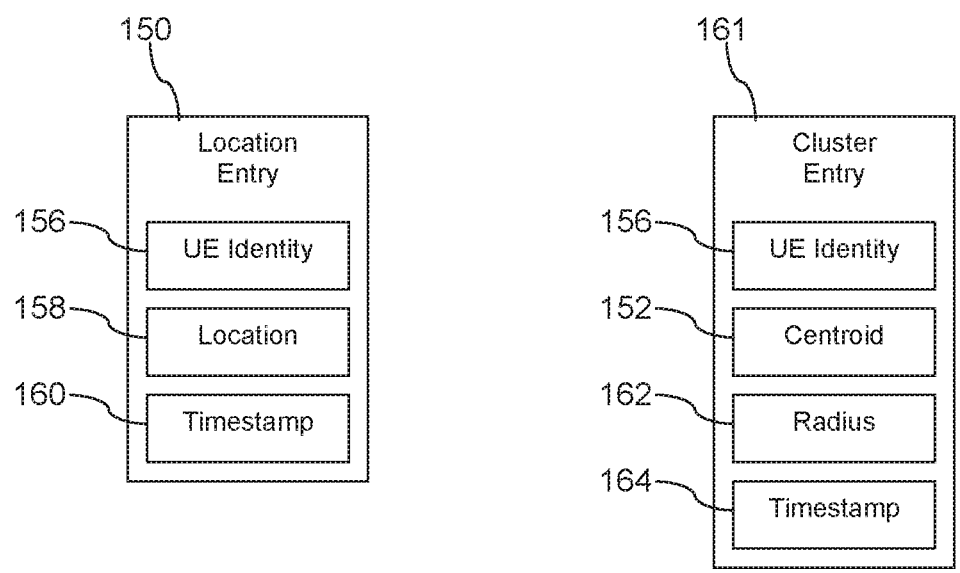
FIG. 3 is a block diagram of a location entry and a cluster entry according to an embodiment of the disclosure.

Turning now to FIG. 3, a location entry 150 and a cluster entry 161 are described. In an embodiment, the location entry 150 comprises a UE identity 156, a location 158, and a timestamp 160. The UE identity 156 may comprise a mobile subscriber directory number (MSDN), a mobile equipment identity (MEID), an electronic serial number (ESN), or other identifying information. The location 158 identifies a location of a UE 102, 110 at a particular time identified by the timestamp 160. The location 158 may comprise a longitude value and a latitude value. The location 158 may comprise a geohash value. The timestamp 160 comprises an indication of a date and a time. The centroid 152 is a location as described above with reference to FIG. 2. The radius 162 may be a distance value that defines a radius of the area 154 associated with the cluster entry 161. The radii 162 of cluster entries 160 located at different places may have different values. For example, a radius 162 of a cluster entry 161 in an urban area may be smaller than the radius 162 of a cluster entry 161 in a rural area or suburban area. In an embodiment, the timestamp 164 may comprise an indication of a date and a time. In an embodiment, the timestamp 164 may comprise two indications of a date and a time—an earliest date and time and a latest date and time of the cluster of location entries 150. For example, when a UE 102, 110 associated with an office worker arrives at the office, the location entries 150 may have different timestamps extending from 8:30 AM on February 10 to 5:30 PM on February 10. The timestamp 164, in this example, may comprise an earliest timestamp of 8:30 AM February 10 and a latest timestamp of 5:30 PM February 10. When the office worker leaves the office to commute home, the next location entry 150 associated with the UE 102, 110 of the office worker may be located in a different cluster associated with the worker's residence.

Figure 4:
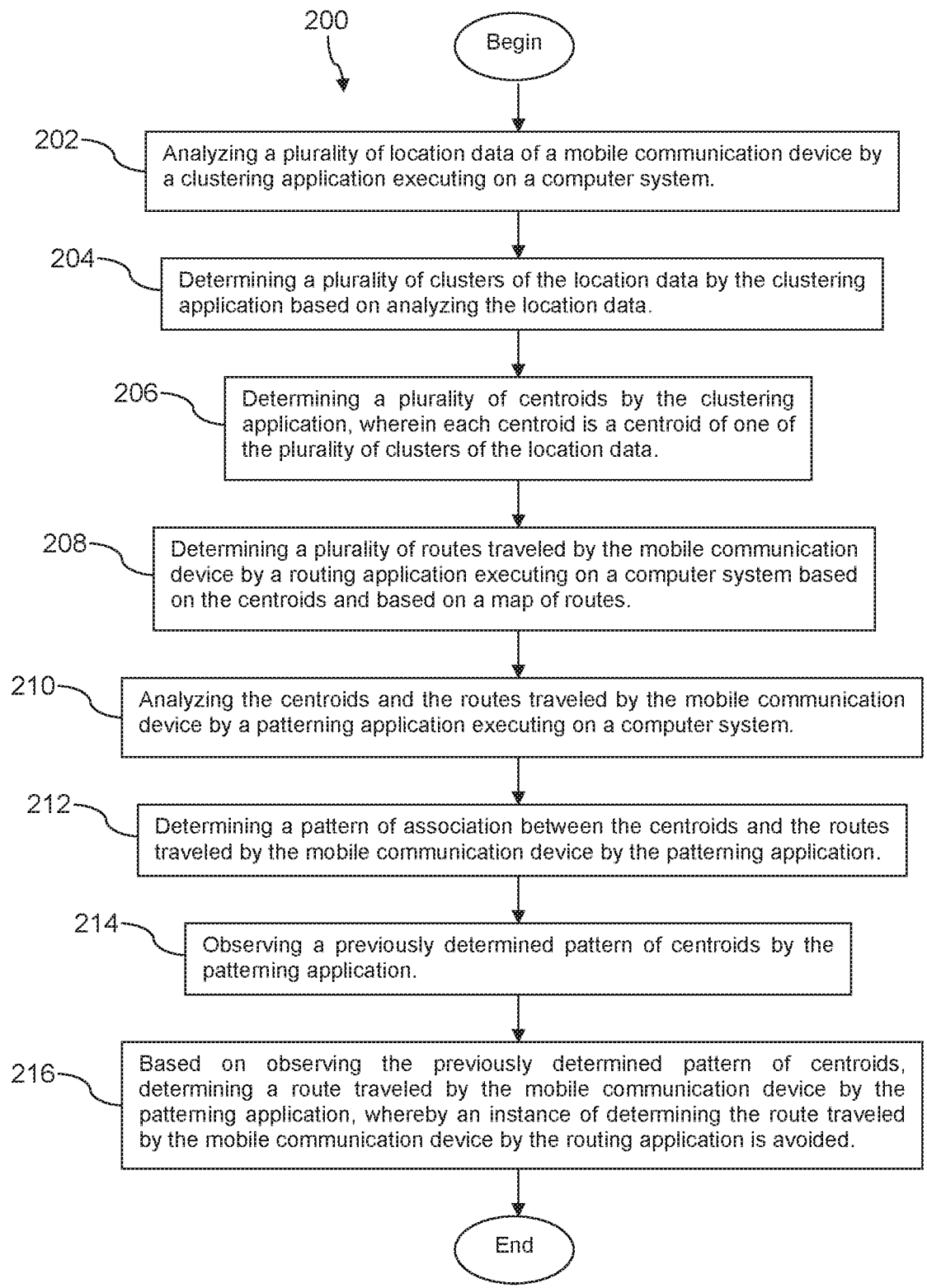
FIG. 4 is a flow chart of a method according to an embodiment of the disclosure.

Turning now to FIG. 4, a method 200 is described. In an embodiment, the method 200 is a method of determining presence of mobile communication devices at points-of-interest (POI) by establishing patterns of location clusters for each device, associating a route traveled by the device to each pattern of location clusters, and deem the device to have followed the associated route when the locations of the mobile communication device matches the associated pattern of location clusters. At block 202, the method 200 comprises analyzing a plurality of location data of a mobile communication device by a clustering application executing on a computer system. At block 204, the method 200 comprises determining a plurality of clusters of the location data by the clustering application based on analyzing the location data.

At block 206, the method 200 comprises determining a plurality of centroids by the clustering application, wherein each centroid is a centroid of one of the plurality of clusters of the location data. The centroid comprises a location that is deemed to be representative of the location of the cluster generally, for example a central point of the cluster of locations. In an embodiment, the centroid may be determined as an average of the locations of the location entries associated with the cluster.

At block 208, the method 200 comprises determining a plurality of routes traveled by the mobile communication device by a routing application executing on a computer system based on the centroids and based on a map of routes. The routes may be determined by a routing machine or routing algorithm that compares centroids to a map of routes proximate to the centroids and selects a route that connects the two centroids via a shortest path. The map of routes may be a digital map of routes, where each route is represented as a sequence of route segments that abut one another. These route segments may comprise mathematical abstractions or computer representations referred to as edges and vertices. The processing of block 208 may further comprise imputing inferred locations of the mobile communication device along the selected route between the two centroids.

At block 210, the method 200 comprises analyzing the centroids and the routes traveled by the mobile communication device by a patterning application executing on a computer system. For example, the centroids and routes are analyzed for a period of time, such as a week period of time or a month period of time. The processing of block 210 may identify centroids and routes which occur at a frequency of or exceeding a predefined occurrence frequency. At block 212, the method 200 comprises determining a pattern of association between the centroids and the routes traveled by the mobile communication device by the patterning application. The processing of block 212 may comprise creating a matrix of centroids that represents centroids of location clusters of the mobile communication device over a predefined period of time such as a day and represents the presence of the device at a specific time at the location of the centroid. For example, the matrix may be a three dimensional matrix, where two dimensions represent longitude and latitude of centroids and the third dimension represents time. Each element in the matrix may have a value that indicates the device is present or not present at the location associated with the element at the time associated with the element, for example a value of '0' may indicate the mobile communication device is not present at the location at the time associated with the element; a value of '1' may indicate the mobile communication device is present at the location at the time associated with the element. In another example, the matrix may be a two dimensional matrix, where one dimension represents a geohash value and the second dimension represents a time value.

At block 214, the method 200 comprises observing a previously determined pattern of centroids by the patterning application. Observing a previously determined pattern of centroids may comprise observing two different centroids in a time sequence. For example, the UE 102, 110 is located in a first cluster having a first centroid at a first time and is located in a second cluster having a second centroid at a second time, where the second time is later than the first time. The pattern may further comprise a time duration, for example the UE 102, 110 is associated with the second centroid less than some predefined period of time after it is associated with the first centroid, for example less than 45 minutes later. This time duration may be associated with some activity, such as commuting from home to work or commuting from work home. This time duration may be associated with driving from home to the gym or from the gym home. The pattern may be defined partly by the absence of a third centroid located in time between the first centroid and the second centroid. For example, the UE 102, 110 may be associated first with a first centroid and later associated second with a second centroid without being associated with a third centroid at a time intermediate between the time it is associated with the first centroid and the time it is associated with the second centroid.

At block 216, the method 200 comprises, based on observing the previously determined pattern of centroids (e.g., observe that the centroids of the location clusters determined based on the location information associated with the UE 102, 110 conform to a previously observed pattern of centroids associated with the same UE 102, 110), determining a route traveled by the mobile communication device by the patterning application, whereby an instance of determining the route traveled by the mobile communication device by the routing application is avoided. The processing of block 216 may comprise reusing or substituting a previously determined route, for example reusing the route calculated when the UE 102, 110 previously traveled from a first centroid to a second centroid. The processing of block 216 may comprise reusing or substituting the previously determined route as well as previously determined inferred locations of the UE 102, 110. It is understood that the processing of method 200 may be performed for each of a very large number of mobile communication devices, for example millions of mobile communication devices or even tens of millions of mobile communication devices. The processing of blocks 214 and 216 may be performed on a frequent periodic basis, for example on a daily basis.

Figure 5:
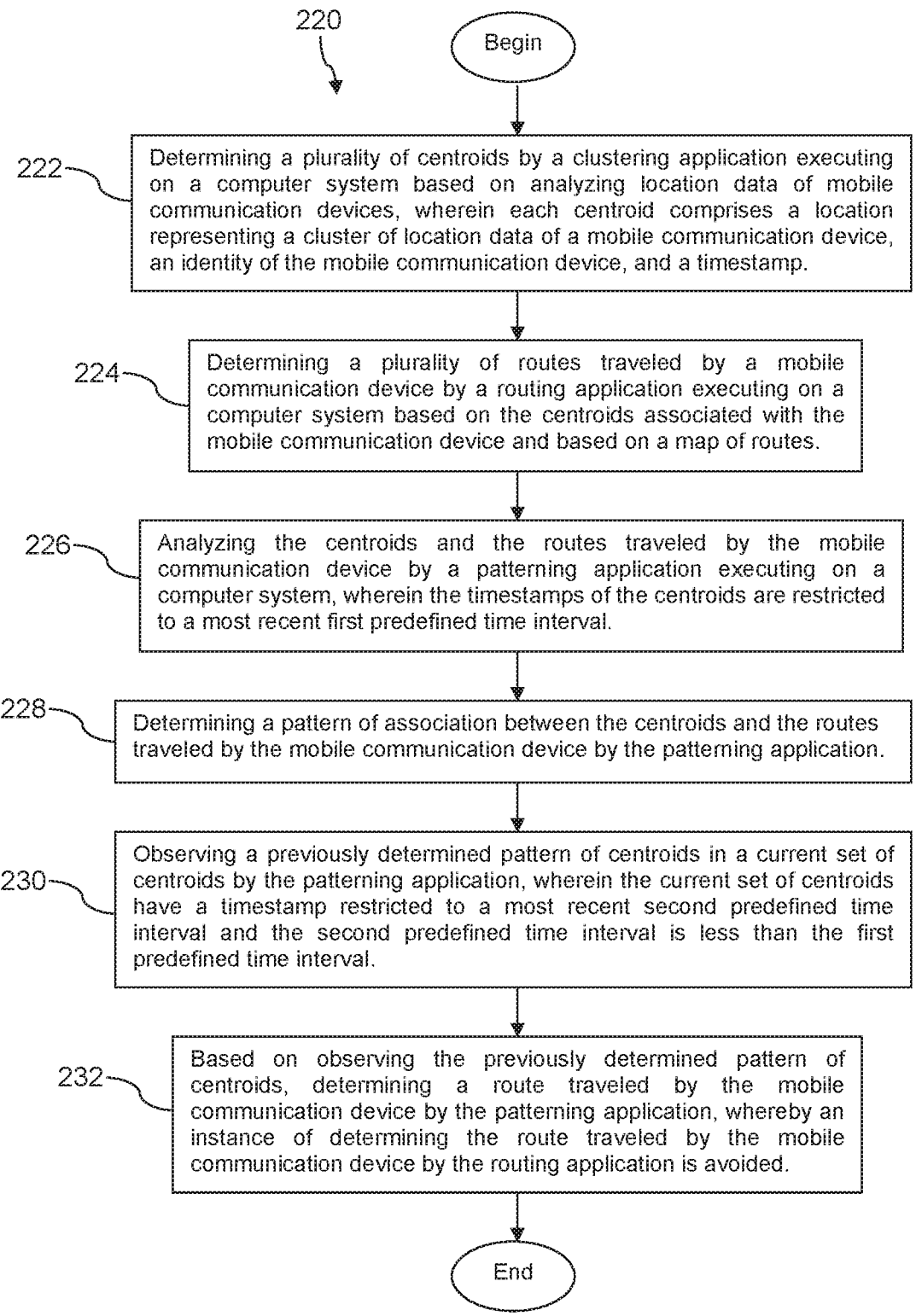
FIG. 5 is a flow chart of another method according to an embodiment of the disclosure.

Turning now to FIG. 5, a method 220 is described. In an embodiment, the method 220 comprises a method of determining presence of mobile communication devices at points-of-interest (POI) by establishing patterns of location clusters for each device, associating a route traveled by the device to each pattern of location clusters, and deeming the device to have followed the associated route when the locations of the mobile communication device matches the associated pattern of location clusters. At block 222, the method 220 comprises determining a plurality of centroids by a clustering application executing on a computer system based on analyzing location data of mobile communication devices, wherein each centroid comprises a location representing a cluster of location data of a mobile communication device, an identity of the mobile communication device, and a timestamp.

At block 224, the method 220 comprises determining a plurality of routes traveled by a mobile communication device by a routing application executing on a computer system based on the centroids associated with the mobile communication device and based on a map of routes. At block 226, the method 220 comprises analyzing the centroids and the routes traveled by the mobile communication device by a patterning application executing on a computer system, wherein the timestamps of the centroids are restricted to a most recent first predefined time interval.

At block 228, the method 220 comprises determining a pattern of association between the centroids and the routes traveled by the mobile communication device by the patterning application. At block 230, the method 220 comprises observing a previously determined pattern of centroids in a current set of centroids by the patterning application, wherein the current set of centroids have a timestamp restricted to a most recent second predefined time interval and the second predefined time interval is less than the first predefined time interval.

At block 232, the method 220 comprises, based on observing the previously determined pattern of centroids, determining a route traveled by the mobile communication device by the patterning application, whereby an instance of determining the route traveled by the mobile communication device by the routing application is avoided.

Figure 6:
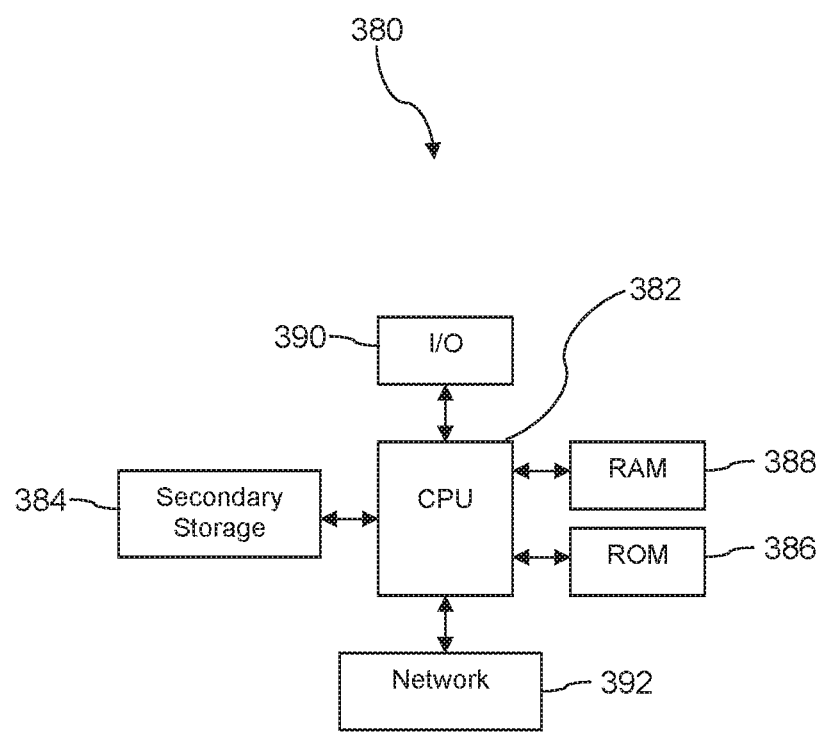
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of determining presence of mobile communication devices at points-of-interest (POI) by establishing patterns of location clusters for each device, associating a route traveled by the device to each pattern of location clusters, and deeming the device to have followed the associated route when the locations of the mobile communication device matches the associated pattern of location clusters, comprising:

analyzing a plurality of location data of a mobile communication device by a clustering application executing on a computer system;

determining a plurality of clusters of the location data by the clustering application based on analyzing the location data;

determining a plurality of centroids by the clustering application, wherein each centroid is a centroid of one of the plurality of clusters of the location data;

determining a plurality of routes traveled by the mobile communication device by a routing application executing on a computer system based on the centroids and based on a map of routes;

analyzing the centroids and the routes traveled by the mobile communication device by a patterning application executing on a computer system;

determining a pattern of association between the centroids and the routes traveled by the mobile communication device by the patterning application;

observing a previously determined pattern of centroids by the patterning application;

based on observing the previously determined pattern of centroids, determining a route traveled by the mobile communication device by the patterning application, whereby an instance of determining the route traveled by the mobile communication device by the routing application is avoided;

determining a plurality of inferred locations between the centroids; and determining an intersection between the route traveled by the mobile communication device and a location of a point-of-interest (POI), wherein determining the intersection between the route traveled by the mobile communication device and the location of the POI comprises determining that at least one of the inferred locations intersects a definition of an area of the POI.

2. The method of claim 1, further comprising counting intersections between routes traveled by a plurality of mobile communication devices with the location of the POI.

3. The method of claim 1, wherein the map of routes comprises footpath mode routes, highway travel mode routes, and light rail travel mode routes.

4. The method of claim 1, wherein the pattern of association between the centroids and the routes traveled is determined by the patterning application based on an average of the centroids.

5. The method of claim 1, wherein the mobile communication device is one of a mobile phone, a smart phone, a personal digital assistant (PDA), a wearable computer, a headset computer, a laptop computer, a notebook computer, or a tablet computer.

6. A method of determining presence of mobile communication devices at points-of-interest (POI) by establishing patterns of location clusters for each device, associating a route traveled by the device to each pattern of location clusters, and deeming the device to have followed the associated route when the locations of the mobile communication device matches the associated pattern of location clusters, comprising:

determining a plurality of centroids by a clustering application executing on a computer system based on analyzing location data of mobile communication devices, wherein each centroid comprises a location representing a cluster of location data of a mobile communication device, an identity of the mobile communication device, and a timestamp;

determining a plurality of routes traveled by a mobile communication device by a routing application executing on a computer system based on the centroids associated with the mobile communication device and based on a map of routes;

analyzing the centroids and the routes traveled by the mobile communication device by a patterning application executing on a computer system, wherein the timestamps of the centroids are restricted to a most recent first predefined time interval;

determining a pattern of association between the centroids and the routes traveled by the mobile communication device by the patterning application;

observing a previously determined pattern of centroids in a current set of centroids by the patterning application, wherein the current set of centroids have a timestamp restricted to a most recent second predefined time interval and the second predefined time interval is less than the first predefined time interval;

based on observing the previously determined pattern of centroids, determining a route traveled by the mobile communication device by the patterning application, whereby an instance of determining the route traveled by the mobile communication device by the routing application is avoided;

determining a plurality of inferred locations between the centroids; and determining an intersection between the route traveled by the mobile communication device and a location of a point-of-interest (POI), wherein determining the intersection between the route traveled by the mobile communication device and the location of the POI comprises determining that at least one of the inferred locations intersects a definition of an area of the POI.

7. The method of claim 6, wherein the first predefined time interval is at least three weeks and the second predefined time interval is less than two days.

8. The method of claim 6, wherein the mobile communication device is one of a mobile phone, a smart phone, a personal digital assistant (PDA), a wearable computer, a headset computer, a laptop computer, a notebook computer, or a tablet computer.

9. The method of claim 6, further comprising counting intersections between routes traveled by a plurality of mobile communication devices with the location of the POI.

10. The method of claim 6, wherein the map of routes comprises footpath mode routes, highway travel mode routes, and light rail travel mode routes.

11. The method of claim 6, wherein the routes traveled by the mobile communication device are further determined based on an assumed travel mode.

12. The method of claim 11, wherein the assumed travel mode comprises one of a highway travel mode, a light rail travel mode, a subway travel mode, a bus travel mode, or a footpath travel mode.

13. The method of claim 6, wherein the pattern of association between the centroids and the routes traveled is determined by the patterning application based on an average of the centroids.

14. The method of claim 1, wherein the routes traveled by the mobile communication device are further determined based on an assumed travel mode.

15. The method of claim 14, wherein the assumed travel mode comprises one of a highway travel mode, a light rail travel mode, a subway travel mode, a bus travel mode, or a footpath travel mode.

16. The method of claim 1, wherein the location data comprises a plurality of a location, an identity of the mobile communication device, an identity of a cell site to which the mobile communication device is attached, or a timestamp identifying when the mobile communication device was located at the identified location.

\* \* \* \* \*